US009294854B2

(12) United States Patent
Fujisawa et al.

(10) Patent No.: US 9,294,854 B2
(45) Date of Patent: Mar. 22, 2016

(54) INFORMATION PROCESSOR, AUDIO PROCESSOR, AUDIO PROCESSING SYSTEM AND PROGRAM

(75) Inventors: Morishige Fujisawa, Hamamatsu (JP); Noriyuki Ohashi, Hamamatsu (JP); Hirochika Maegaki, Hamamatsu (JP)

(73) Assignee: YAMAHA CORPORATION, Hamamatsu-shi, Shizuoka (JP)

( * ) Notice: Subject to any disclaimer, the term of this patent is extended or adjusted under 35 U.S.C. 154(b) by 213 days.

(21) Appl. No.: 13/819,794

(22) PCT Filed: Aug. 30, 2011

(86) PCT No.: PCT/JP2011/069649
§ 371 (c)(1),
(2), (4) Date: Feb. 28, 2013

(87) PCT Pub. No.: WO2012/029808
PCT Pub. Date: Mar. 8, 2012

(65) Prior Publication Data
US 2013/0170658 A1 Jul. 4, 2013

(30) Foreign Application Priority Data

Aug. 30, 2010 (JP) ................. 2010-192968

(51) Int. Cl.
*H03G 3/00* (2006.01)
*H04R 29/00* (2006.01)
(Continued)

(52) U.S. Cl.
CPC ................ *H04R 29/00* (2013.01); *H04S 7/303* (2013.01); *H04S 3/008* (2013.01)

(58) Field of Classification Search
CPC ............ H04R 29/00; H04R 5/00; H04R 5/02; H04R 3/00; H04R 2227/005; H04R 27/00; H04R 3/12; H04R 5/04; H04R 1/028; H04R 2499/13; H04R 2420/01; H04R 2420/03;
(Continued)

(56) References Cited

U.S. PATENT DOCUMENTS

| 6,540,613 B2 | 4/2003 | Okubo et al. |
| 2001/0023202 A1 | 9/2001 | Okubo |

(Continued)

FOREIGN PATENT DOCUMENTS

| JP | 08-243254 A | 9/1996 |
| JP | 2001-252467 A | 9/2001 |

(Continued)

OTHER PUBLICATIONS

Office Action issued in Japanese Patent Application No. 2010-192968 dated Oct. 22, 2013.
(Continued)

*Primary Examiner* — Leshui Zhang
(74) *Attorney, Agent, or Firm* — Rossi, Kimms & McDowell LLP

(57) ABSTRACT

An audio processor acquires processed sound data, which is obtained by processing original sound data according to a content of processing defined such that first sound is emitted under the standard sound emission condition, in association with a sound emission device, acquires a control signal, and acquires a device sound emission condition. In order to make second sound emitted by the sound emission device under the acquired device sound emission condition close to the first sound, the audio processor identifies the correction content of the processed sound data based on a difference between the device sound emission condition and the standard sound emission condition, the control signal, and the processed sound data acquired in association with the sound emission device. The audio processor corrects the processed sound data according to the correction content, and supplies the corrected processed sound data to the sound emission device.

5 Claims, 11 Drawing Sheets

(51) Int. Cl.
*H04S 7/00* (2006.01)
*H04S 3/00* (2006.01)

(58) Field of Classification Search
CPC .............. H04R 2420/07; H04R 1/288; H04R 2430/01; H04N 7/173; H04N 5/44; H04N 5/04; H04N 9/7904; H04N 21/44218; H04N 21/8106; H04S 5/02; H04S 1/00; H04S 7/00; H04S 7/30; H04S 7/301; H04S 7/302; H04S 7/303; H04S 7/305; H04S 7/307; H04S 1/007; H04S 5/00; H04S 5/005; H04S 3/00; H04S 2400/01; H04S 2400/11; H04S 2400/05; H04S 2400/13; H04S 2420/01; H04S 2420/13; G10L 11/04; G10L 13/08; G10L 13/00; G10L 15/10; G10L 15/00; G10L 19/008; G10K 15/00; G10K 15/12; G10K 15/04; A63F 9/22; A63F 13/00; G06F 3/162; G06F 3/165; G06F 3/167; G06F 3/16; G06F 3/013; G06F 3/043; G06F 3/048; G06F 3/0482; G06F 3/0484; G06F 3/0488; G06F 17/3074; G06F 17/00; G06F 17/30044; G06F 17/30746; G06F 17/30749; G06F 17/30752; G06F 17/30761; G06F 1/00; G06F 9/4411; G06F 9/44505; H03G 3/00; H03G 3/20; H03G 3/3005; G11B 20/10527; G11B 2020/10592; G11B 27/11; G11B 2020/10546; H04L 65/60

USPC ............. 381/58, 1, 5, 6, 7, 10, 11, 12, 14–23, 381/300, 301, 302–307, 309, 311, 27, 28, 381/59, 61, 63, 77, 80–86, 89, 332, 333, 381/118, 119, 123; 700/94

See application file for complete search history.

(56) References Cited

U.S. PATENT DOCUMENTS

| | | |
|---|---|---|
| 2005/0220309 A1 | 10/2005 | Hirata et al. |
| 2008/0273721 A1 * | 11/2008 | Walsh .......................... 381/300 |
| 2010/0235166 A1 | 9/2010 | Bardino et al. |

FOREIGN PATENT DOCUMENTS

| | | | |
|---|---|---|---|
| JP | 2005-286903 A | | 10/2005 |
| JP | 2006033551 A | | 2/2006 |
| JP | 2008245984 A | | 10/2008 |
| JP | 2009-027601 A | | 2/2009 |
| JP | 2009027601 A | * | 2/2009 |
| JP | 2010-507123 A | | 3/2010 |
| JP | 2010-118838 A | | 5/2010 |

OTHER PUBLICATIONS

International Search Report for PCT/JP2011/069649, mail date Oct. 4, 2011. English translation provided.

Dffice Action issued in JP2015-077488, mailed Jan. 19, 2016. English translation provided.

* cited by examiner

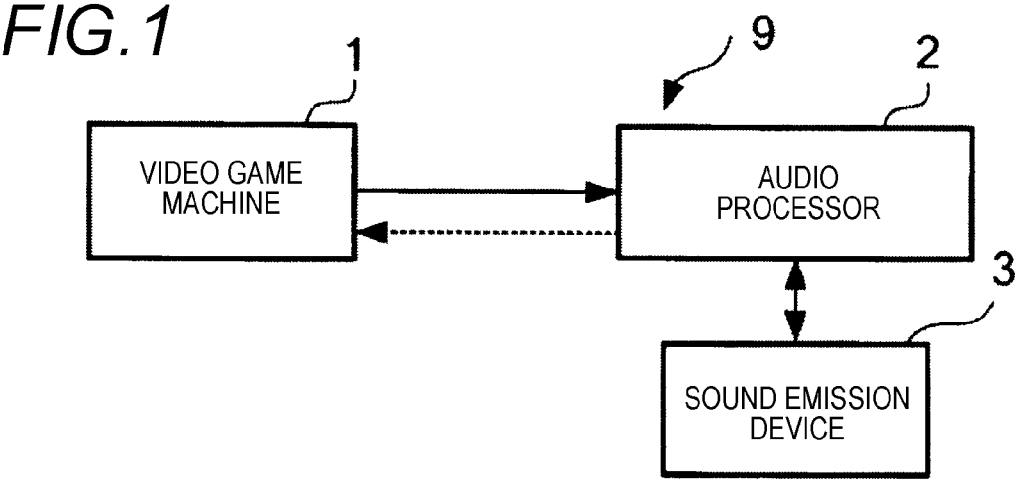
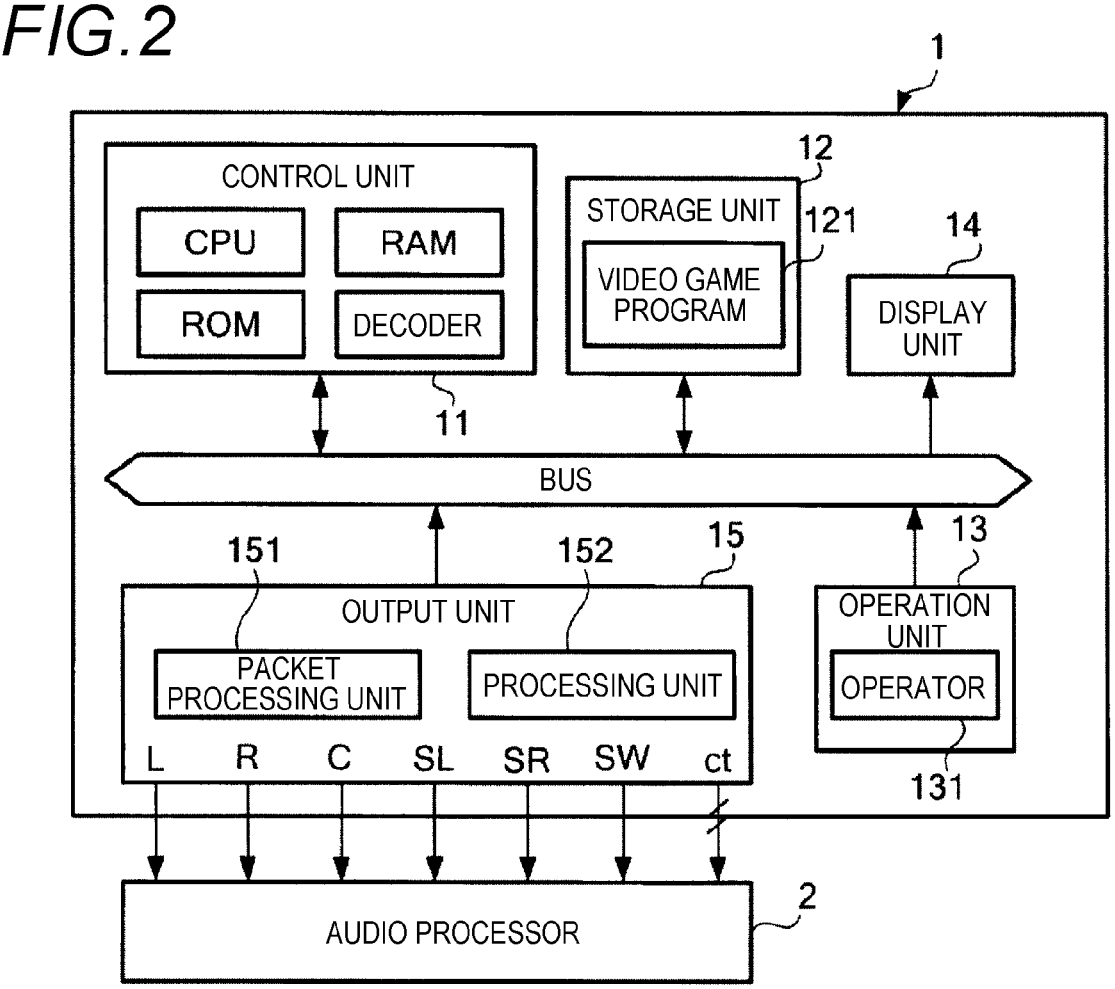

| \multicolumn{5}{c|}{t=0.0} |
|---|---|---|---|---|
| ch | TYPE | LOCALIZATION | REVERBERATION RATE | BIT RATE |
| ch1 | BGM(L) | 45 DEGREES | 12% | 128kbps |
| ch2 | BGM(R) | -45 DEGREES | 12% | 128kbps |
| ch3 | SE | 90 DEGREES | 41% | 64kbps |
| ch4 | SYS | 0 DEGREE | 0% | 64kbps |
| ch5 | VO | 0 DEGREE | 0% | 64kbps |

(b)

| \multicolumn{5}{c|}{t=2.5} |
|---|---|---|---|---|
| ch | TYPE | LOCALIZATION | REVERBERATION RATE | BIT RATE |
| ch1 | BGM(L) | 45 DEGREES | 12% | 128kbps |
| ch2 | BGM(R) | -45 DEGREES | 12% | 128kbps |
| ch3 | SE | *30 DEGREES* | *12%* | 64kbps |
| ch4 | SYS | 0 DEGREE | 0% | 64kbps |
| ch5 | VO | *135 DEGREES* | 0% | 64kbps |

(c)

| \multicolumn{5}{c|}{t=10.0} |
|---|---|---|---|---|
| ch | TYPE | LOCALIZATION | REVERBERATION RATE | BIT RATE |
| ch1 | BGM(L) | 45 DEGREES | 12% | 128kbps |
| ch2 | BGM(R) | -45 DEGREES | 12% | 128kbps |
| ch3 | - | - | - | - |
| ch4 | SYS | 0 DEGREE | 0% | 64kbps |
| ch5 | *SYS* | *0 DEGREE* | 0% | 64kbps |

| | t=0.0 | | |
|---|---|---|---|
| ch | TYPE | SOUND EFFECT | BIT RATE |
| L | BGM(L),SE | 0% | 128kbps |
| R | BGM(R) | 0% | 128kbps |
| SL | SE | 12% | 64kbps |
| SR | SYS | 0% | 64kbps |
| C | VO | 0% | 64kbps |

(b)

| | t=2.5 | | |
|---|---|---|---|
| ch | TYPE | REVERBERATION RATE | BIT RATE |
| L | BGM(L),SYS,SE | 12% | 128kbps |
| R | BGM(R),SYS | 12% | 128kbps |
| SL | VO | 12% | 64kbps |
| SR | - | - | - |
| C | - | - | - |

(c)

| | t=10.0 | | |
|---|---|---|---|
| ch | TYPE | REVERBERATION RATE | BIT RATE |
| L | BGM(L),SYS | 0% | 128kbps |
| R | BGM(R),SYS | 0% | 128kbps |
| SL | BGM(L) | 12% | 128kbps |
| SR | BGM(R) | 12% | 128kbps |
| C | | | |

FIG.8

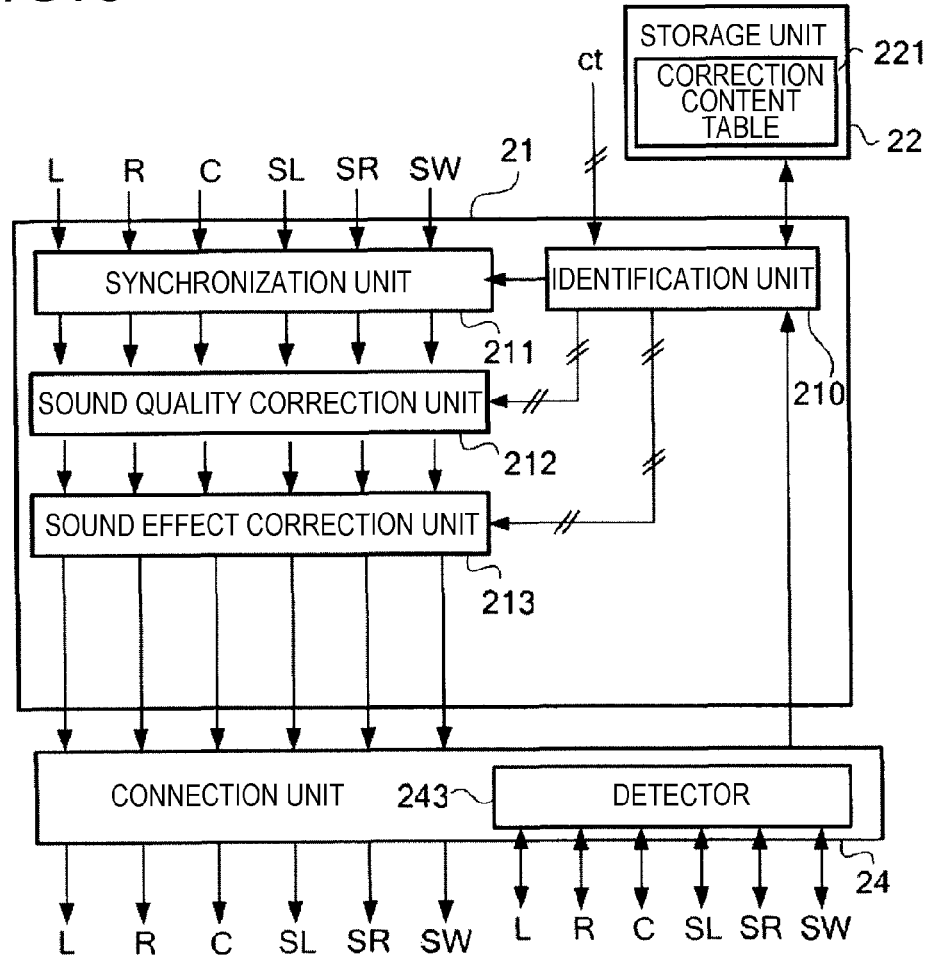

FIG.9

| CORRECTION CONDITION | CORRECTION CONTENT |
|---|---|
| LACK | ALLOCATE TO NEARBY SOUND EMISSION DEVICE |
| LACK OF RANGE REPRODUCTION ABILITY | ALLOCATE TO NEARBY SOUND EMISSION DEVICE FOR EACH RANGE |
| INTENSITY OF REVERBERATION | REMOVE/ADD REVERBERATION |
| MISALIGNMENT | ADJUST SOUND PRESSURE DEPENDING ON DISTANCE FROM TARGET LOCALIZATION |
| LACK OF SOUND QUALITY DUE TO HIGH COMPRESSION | PERFORM SOUND QUALITY IMPROVEMENT PROCESSING OF COMPRESSED SOUND |
| ⋮ | ⋮ |

FIG.10
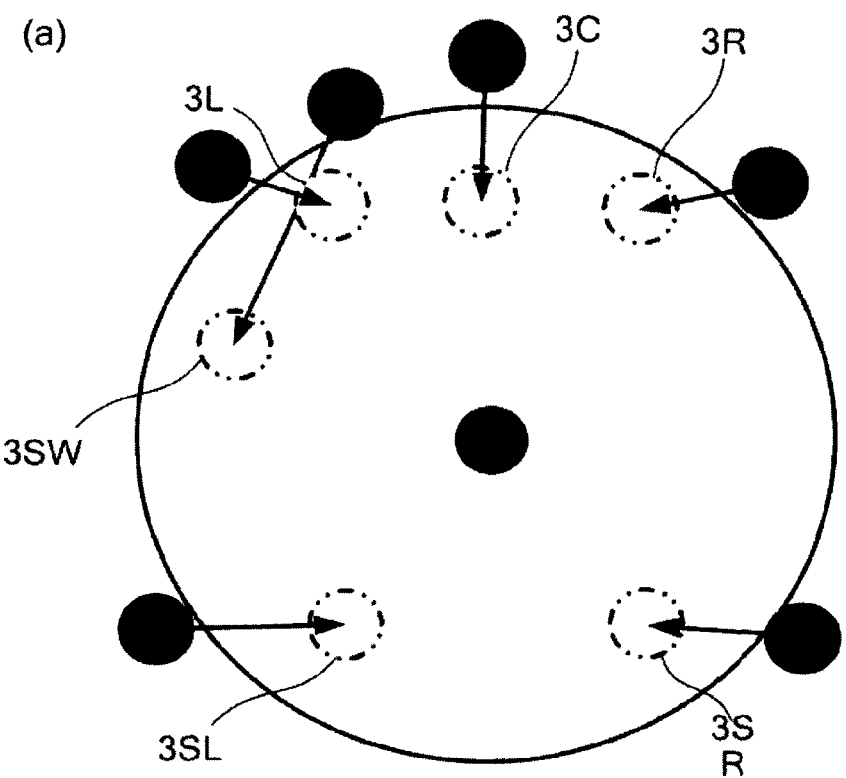
(a)
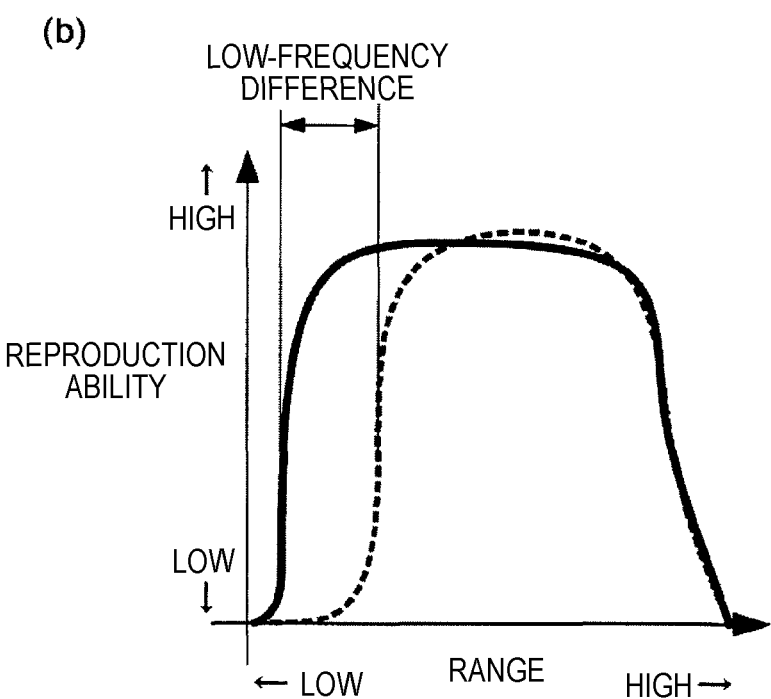
(b)

INFORMATION PROCESSOR, AUDIO PROCESSOR, AUDIO PROCESSING SYSTEM AND PROGRAM

This application is a U.S. National Phase Application of PCT International Application PCT/JP2011/069649 filed on Aug. 30, 2011, which is based on and claims priority from JP 2010-192968 filed on Aug. 30, 2010 the contents of which is incorporated in its entirety by reference.

TECHNICAL FIELD

The present invention relates to an audio processing technique when contents, such as video game software, are expressed using a computer.

BACKGROUND ART

As video game software (hereinafter, referred to as video game software) which is executed by a specialized video game machine (hereinafter, referred to as a video game machine) with an embedded computer, a personal computer, or the like, there is video game software which expresses a three-dimensional space or reproduces a motion image in accordance with the progress of the video game. There is also a reproducer which reproduces video content recorded in a commercially available DVD (Digital Versatile Disc) video, Blu-ray (Registered Trademark) disc video, or the like (hereinafter, referred to as DVD video or the like) in accordance with user operation.

A video game machine which executes video game software or a reproducer which reproduces video content is an information processor which performs information processing. In general, the information processor is connected to an amplifier including a sound emission device, such as a speaker, and transmits a sound signal to the amplifier such that sound is synchronized with video of the content. Although many information processors mix sound such that a sound field is formed in accordance with the standard audio environment defined in advance over all contents and then transmit the sound to the amplifier, an information processor which changes a sense of sound field in accordance with the progress of a content to obtain a sense of reality or a sense of strong impact has been developed. For example, Patent Literature 1 discloses a technique which switches the effects of reproduced sound in accordance with the progress of a video game.

CITATION LIST

Patent Literature

Patent Literature 1: JP-A-8-243254

SUMMARY OF INVENTION

Technical Problem

However, according to the technique of Patent Literature 1, while the sound field changes when the conditions relating to the progress of the video game are satisfied, there are various kinds of sound, such as operation sound, ambient sound, and BGM (background music), and the same sound field is applied to the plurality of types of sound without exception based on standard sound emission conditions. For this reason, in the technique of Patent Literature 1, the desired sound effect is not obtained depending on the type of sound or the sound emission conditions when reproducing under actual sound emission conditions.

An object of the invention is to emit predetermined sound under actual sound emission conditions of a sound emission device by means of processed sound data processed based on standard sound emission conditions.

Solution to Problem

In order to solve the problem as mentioned above, an audio processor according to the invention is an audio processor for being connected to a sound emission device that emits a sound according to supplied data, the audio processor including: a processed sound data acquirer that is adapted to acquire processed sound data, which is obtained by processing original sound data according to a content of processing defined such that determined first sound is emitted under a standard sound emission condition as a predetermined sound emission condition, wherein the processed sound data is acquired in association with the sound emission device; a control signal acquirer that is adapted to acquire a control signal including at least one of a parameter indicating the content of processing on the original sound data and information indicating a configuration of processed sound data obtained by processing the original sound data by means of the parameter; a sound emission condition acquirer that is adapted to acquire a device sound emission condition as a sound emission condition for the sound emission device; an identifier that is adapted to identify a correction content of the processed sound data based on a difference between the device sound emission condition and the standard sound emission condition, the control signal acquired by the control signal acquirer and the processed sound data acquired in association with the sound emission device by the processed sound data acquirer in order to make a second sound, which is emitted by the sound emission device under the device sound emission condition acquired by the sound emission condition acquirer, close to the first sound or a third sound defined to be different from the first sound; a corrector that is adapted to correct the processed sound data according to the correction content identified by the identifier; and a supplier that is adapted to supply the processed sound data corrected by the corrector to the sound emission device.

Preferably, an identification information acquirer is included that is adapted to acquire identification information of the original sound data, and the control signal acquirer is adapted to transmit the identification information of the original sound data acquired by the identification information acquirer to an external device, and to acquire the control signal including at least one of the parameter of the original sound data indicated by the identification information and information indicating a configuration of processed sound data obtained by processing the original sound data by means of the parameter from the external device.

Preferably, a transmitter is included that is adapted to transmit a signal indicating the device sound emission condition acquired by the sound emission condition acquirer to an information processor causing the processed sound data acquirer to acquire the processed sound data, and the supplier supplies uncorrected processed sound data to the sound emission device without a correction of the processed sound data by the corrector when the processed sound data acquired by the processed sound data acquirer is a processed sound data which is obtained by processing the original sound data according to the content of processing defined such that the first sound is emitted under the device sound emission condition indicated by the signal transmitted by the transmitter.

An information processor according to the invention includes: a generator that is adapted to generate original sound data indicating original sound and a parameter indicating a content of processing on the original sound data in accordance with user operation; a processed sound data generator that is adapted to process the original sound data generated by the generator according to the content of processing indicated by the parameter to generate processed sound data; a processed sound data output section that is adapted to output the processed sound data generated by the processed sound data generator from any channel of a plurality of channels; and a control signal output section that is adapted to output a control signal including at least one of the parameter indicating the content of processing on the original sound data and information indicating a configuration of processed sound data obtained by processing the original sound data by means of the parameter.

An audio processing system according to the invention includes: the audio processor as mentioned above and the information processor as mentioned above.

A program according to the invention is a program which causes a computer, for being connected to a sound emission device that emits a sound according to supplied data, to function as: a processed sound data acquirer that is adapted to acquire processed sound data, which is obtained by processing original sound data according to a content of processing defined such that determined first sound is emitted under a standard sound emission condition as a predetermined sound emission condition, wherein the processed sound data is acquired in association with the sound emission device; a control signal acquirer that is adapted to acquire a control signal including at least one of a parameter indicating the content of processing on the original sound data and information indicating a configuration of processed sound data obtained by processing the original sound data by means of the parameter; a sound emission condition acquirer that is adapted to acquire a device sound emission condition as a sound emission condition for the sound emission device; an identifier that is adapted to identify a correction content of the processed sound data based on a difference between the device sound emission condition and the standard sound emission condition, the control signal acquired by the control signal acquirer and the processed sound data acquired in association with the sound emission device by the processed sound data acquirer in order to make a second sound, which is emitted by the sound emission device under the device sound emission condition acquired by the sound emission condition acquirer, close to the first sound or a third sound defined to be different from the first sound; a corrector that is adapted to correct the processed sound data according to the correction content identified by the identifier; and a supplier that is adapted to supply the processed sound data corrected by the corrector to the sound emission device.

Advantageous Effects of Invention

According to the invention, it is possible to emit predetermined sound under actual sound emission conditions of a sound emission device by means of processed sound data processed based on standard sound emission conditions.

BRIEF DESCRIPTION OF DRAWINGS

FIG. 1 is a diagram showing the configuration of an audio processing system according to an embodiment of the invention.

FIG. 2 is a diagram showing the configuration of a video game machine.

FIG. 4 is a diagram showing an example of a control signal generated by a control signal generation unit.

FIG. 5 is a diagram showing an example of a processed control signal which is transmitted from an output unit.

FIG. 8 is a diagram showing the functional configuration of mainly a control unit of the audio processor.

FIG. 9 is a table showing an example of a correction content table which is stored in a storage unit.

FIG. 10 is a diagram illustrating the outline of correction processing.

DESCRIPTION OF EMBODIMENTS

Figure 3:
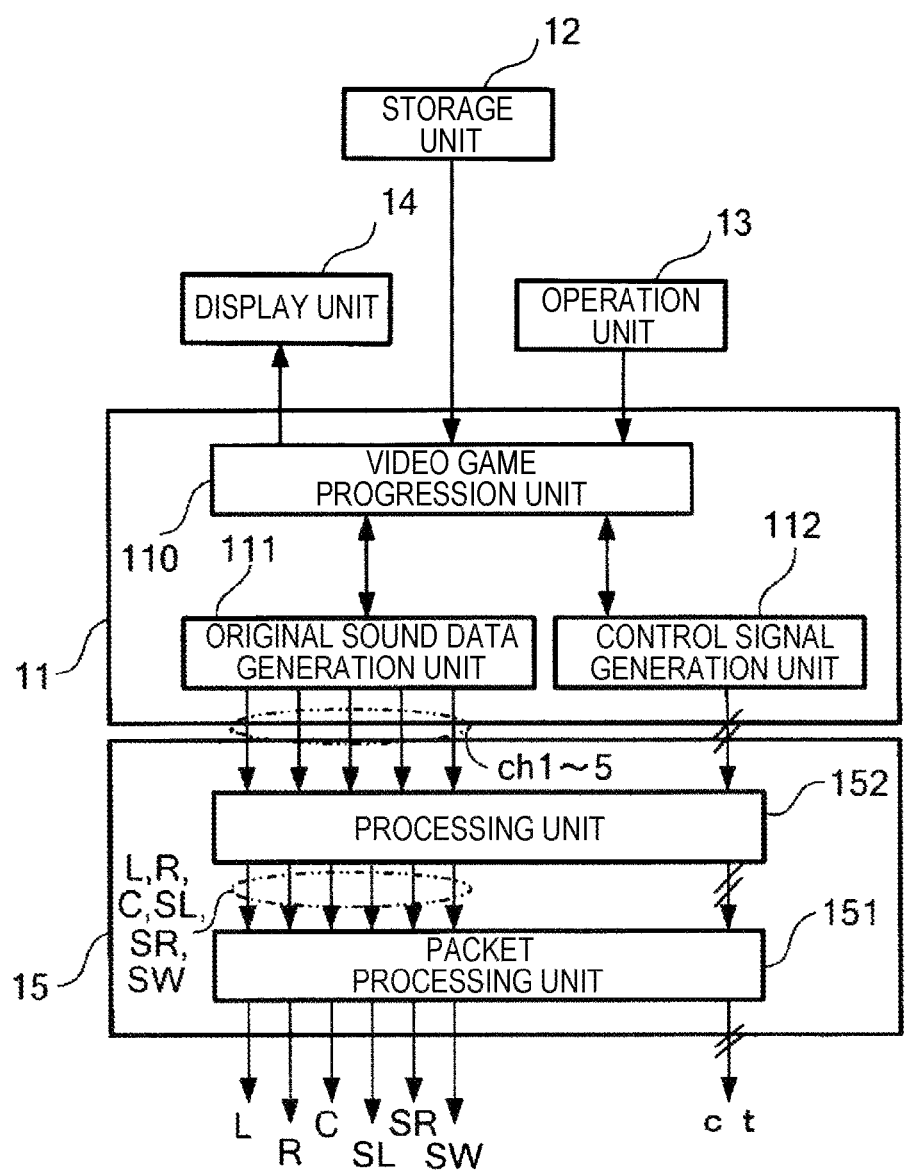
FIG. 3 is a diagram showing the functional configuration of the video game machine.

1. Configuration 1-1. Overall Configuration of System

FIG. 1 is a diagram showing the configuration of an audio processing system 9 according to an embodiment of the invention. The audio processing system 9 includes a video game machine 1, an audio processor 2, and a sound emission device 3. The video game machine 1 and the audio processor 2 are connected together by a multi-channel communication cable in accordance with a standard, such as HDMI (High-Definition Multimedia Interface; Registered Trademark). The term "channel" means a transmission path through which data is transmitted, and the term "multi-channel communication cable" means a communication cable which has a plurality of separate channels. The video game machine 1 is an example of an information processor which reproduces software or contents. The audio processor 2 and the sound emission device 3 are connected together by an audio cable through which an audio signal is transferred. The video game machine 1 and the audio processor 2 are able to exchange information with each other, and while the transfer of information from the audio processor 2 to the video game machine 1 can be performed as indicated by a broken line in FIG. 1, this will be omitted in the following description of the embodiment.

1-2. Configuration of Video Game Machine

FIG. 2 is a diagram showing the configuration of the video game machine 1. A control unit 11 has a CPU (Central Processing Unit), a ROM (Read Only Memory), and a RAM (Random Access Memory), and controls the respective units of the video game machine 1 using the CPU which reads and executes a boot loader stored in the ROM or various programs stored in a storage unit 12 on the RAM. The control unit 11 includes a decoder which decompresses motion images and sound data compressed in accordance with the standard, such as MPEG2 or MPEG4, and generates uncompressed PCM (pulse code modulation) data. The decoder may be realized by a specialized processor which is hardware different from the CPU or may be realized by the CPU which executes a program. The control unit 11 functions as, for example, a video game progression unit 110, an original sound data generation unit 111, or the like.

The storage unit 12 is high-capacity storage means, such as a hard disk drive, and stores various programs which are read into the control unit 11. A video game program 121 is one of various programs. The storage unit 12 may be a recording medium, such as an external nonvolatile memory. In this case, the storage unit 12 is connected to the video game machine 1 through a connection interface (not shown) or the like. The storage unit 12 may include a reader which reads a recording medium, such as an optical disk. In this case, the storage unit 12 may read a recording medium loaded in the reader, and if the recording medium is rewritable, may perform rewriting on the recording medium.

An operation unit 13 includes an operator 131 which gives various instructions. The operation unit 13 receives user operation and supplies an operation signal according to the operation content to the control unit 11.

The display unit 14 includes, for example, a display, such as a liquid crystal display, and displays video according to the progress of a video game under the control of the control unit 11.

An output unit 15 is an interface which sends a plurality of pieces of sound data and control signals to the audio processor 2 such that a plurality of kinds of sound according to the progress of the video game are emitted to the audio processor 2 under the control of the control unit 11. The output unit 15 includes a packet processing unit 151 and a processing unit 152. The processing unit 152 processes sound data (hereinafter, referred to as original sound data) indicating original sound obtained from the original sound data generation unit 111 described below to generate a plurality of pieces of sound data (hereinafter, referred to as processed sound data) according to the progress of the video game. The processing unit 152 is a processor which performs processing, such as mixing of original sound data under the control of the control unit 11. The packet processing unit 151 divides the generated processed sound data in terms of audio frames as a unit of sound reproduction, and adds a header including a time stamp indicating a reproduction time, or the like to form packets.

The output unit 15 is connected to the audio processor 2 through the multi-channel communication cable. The communication cable has seven channels. A control signal is output to one channel ct from among the channels, and the packetized processed sound data is transmitted to the remaining six channels L, R, C, SL, SR, and SW. The details of the control signal will be described below.

1-3. Functional Configuration of Video Game Machine

FIG. 3 is a diagram showing the functional configuration of the video game machine 1. The control unit 11 reads and executes the video game program 121 (see FIG. 2) stored in the storage unit 12 to function as the video game progression unit 110, the original sound data generation unit 111, and the control signal generation unit 112. The video game progression unit 110 progresses the video game in accordance with user operation along the video game program 121. That is, the video game progression unit 110 functions as a video game progression section that is adapted to progress the video game in accordance with user operation. Specifically, the video game progression unit 110 reads configuration information of the video game stored in the storage unit 12, and determines the progress of the video game, the allocation of the operation signal, or the like in accordance with the configuration information. The video game progression unit 110 interprets the operation signal indicating user operation received by the operation unit 13 and progresses the video game. The video game progression unit 110 reads video data indicating video according to the progress of the video game from the storage unit 12, sends video data to the display unit 14, and displays video according to video data on the display unit 14. The video game progression unit 110 reads sound data to be used in the video game from the storage unit 12 in accordance with the progress of the video game.

The original sound data generation unit 111 individually generates original sound data indicating original sound based on sound data read by the video game progression unit 110. The original sound data generation unit 111 generates identification information for identifying original sound data to be generated and a time stamp indicating the timing at which sound should be emitted in accordance with processed sound data of the original sound data in association with the original sound data. The term "original sound" means a sound as a basis for a processed sound to be heard by the user of the video game in accordance with the progress of the video game, and includes, for example, BGM, ambient sound, voice, system sound, and the like. BGM (Background Music) is music for increasing the emotion of the user. Ambient sound is sound, such as the footstep of a game character operated by the user or sound of wind and rain, which expresses a virtual space in the video game. Voice is voice of a game character which appears in the video game. System sound is sound for causing the user to recognize that the operation unit 13 receives operation, and includes, for example, clicking sound, chime sound, and the like. The number of pieces of original sound data which are generated simultaneously by the original sound data generation unit 111 will change depending on the progress of the video game. Here, as shown in FIG. 4, the number of pieces of original sound data which are generated by the original sound data generation unit 111 is a maximum of five. These pieces of original sound data are supplied to the processing unit 152 through channels ch1 to ch5. The original sound data generation unit 111 functions as a generator that is adapted to generate original sound data indicating original sound in accordance with user operation. In this case, in particular, the original sound data generation unit 111 functions as original sound data a generator that is adapted to generate original sound data according to the progress of the video game progressed by the video game progression section. The identification information or the time stamp of the original sound data may include the header of the original sound data, or the like.

The control signal generation unit 112 generates a control signal which describes each attribute of each piece of original sound data in association with the identification information of each piece of original sound data generated by the original sound data generation unit 111. The attribute is information which designates how original sound indicated by original sound data is heard by the user. Specifically, the attribute refers to the attribute of sound (hereinafter, referred to as first sound) determined to be emitted under standard sound emission conditions (hereinafter, referred to as standard sound emission conditions) of the sound emission device 3 connected to the audio processor 2, and includes, for example, the direction in which the sound is heard, reverberant sound of the sound, the sound range of the sound, or the like. The content of processing on original sound data is defined by a parameter such that the first sound is emitted under the standard sound emission conditions. The parameter indicating the content of processing is defined in accordance with the progress of the video game.

The sound emission conditions are sound emission conditions which are defined depending on the disposition or ability of the sound emission device 3, and include, for example, conditions of the number of sound emission devices 3, such as speakers, the angle and distance with respect to the listening position of the user, the sound range in which sound can be emitted, intensity of reverberation, and the like. The standard sound emission conditions are conditions defined in advance for 5.1 ch surround based on Dolby AC-3 (Registered Trademark), and indicate the disposition of sound sources corresponding to six channel signals in total of front left and right and central main signals L, R, and C, left and right surround signals SL and SR, and a subwoofer signal SW, and the sound emission ability of a speaker which expresses each sound source. Accordingly, the control signal generation unit 112 functions as a generator that is adapted to generate a parameter indicating the content of processing on original sound data in accordance with user operation. In this case, in particular, the control signal generation unit 112 functions as a generator that is adapted to generate a parameter indicating the content of processing on original sound data according to the progress of the video game progressed by the video game progression section.

The processing unit 152 of the output unit 15 acquires the parameter from the control signal generation unit 112. The processing unit 152 processes each piece of original sound data generated by the original sound data generation unit 111 based on the acquired parameter, and generates a plurality of pieces of processed sound data. The details of the processing unit 152 will be described below. Here, it is assumed that processed sound data is PCM data like original sound data.

The processing unit 152 generates information indicating the configuration of processed sound data obtained by processing original sound data by means of the acquired parameter, and outputs a control signal (hereinafter, referred to as a processed control signal) including the information.

The packet processing unit 151 packetizes a plurality of pieces of processed sound data generated by the processing unit 152, and outputs the packets to the audio processor 2 using individual channels. Accordingly, the output unit 15 functions as a processed sound data output section that is adapted to output processed sound data generated by a processed sound data generator from any channel of a plurality of channels.

In order to process original sound data under actual sound emission conditions (hereinafter, referred to as device sound emission conditions) specific to the sound emission device 3 instead of the standard sound emission conditions, various kinds of information in the sound emission device 3, such as the position or reproduction ability of each sound emission device 3 to which a connection unit 24 of the audio processor 2 is connected, are required. For this reason, the video game machine 1 processes original sound data under the standard sound emission conditions defined in advance to generate processed sound data, and the audio processor 2 corrects the generated processed sound data under the actual device sound emission conditions of the sound emission device 3.

The packet processing unit 151 of the output unit 15 outputs the processed control signal generated by the processing unit 152 to the audio processor 2 in association with the channels of a plurality of pieces of processed sound data. The synchronization between the processed sound data and the control signal is made by the time stamp included in the control signal and the time stamp used when each piece of processed sound data is packetized. Accordingly, the output unit 15 functions as a control signal output section that is adapted to output a control signal (processed control signal) which includes information indicating the configuration of processed sound data obtained by processing original sound data by means of the parameter indicating the content of processing on original sound data generated by the generator.

1-4. Configuration of Control Signal and Processed Control Signal

FIG. 4 is a diagram showing an example of a control signal generated by the control signal generation unit 112. FIG. 5 is a diagram showing an example of a processed control signal which is generated by the processing unit 152 and transmitted from the channel ct of the output unit 15. As shown in FIG. 4, the control signal describes the time stamp indicating the timing at which the control signal should be applied and parameters indicating four attributes of type, localization, reverberation rate, and bit rate defined for the respective channels (ch 1 to ch 5).

The type refers to the type of original sound indicated by original sound data, and specifically includes BGM, SE (ambient sound), VO (voice), SYS (system sound), and the like. Since original sound data is identifiable depending on the type, here, the parameter indicating the type is used as identification information of original sound data.

The localization is the direction in which the user feels that there is a sound generation point. For example, 0 degree is the front direction of the user, and one circle to the left side (that is, a counterclockwise direction when viewed from above the head of the user) from the front direction is expressed in 360 degrees.

The reverberation rate is a value indicating the intensity of reverberation, which is a sound effect of applying reverberation to sound such that the user feels the width of the space, and when the volume of original sound as a basis is 100%, expresses the ratio of volume of reverberant sound applied to original sound in percentage. As the percentage is high, strong reverberation is applied, and the user feels the width of the space.

The bit rate expresses the amount of information per second of sound included in original sound data with the number of bits, and indicates quality of original sound data.

For example, in the control signal shown in FIG. 4(*a*), the time stamp is t=0.0 second, the type of original sound data which is transmitted from the channel ch1 is BGM(L), and the localization is −45 degrees. In regard to original sound data which is transmitted from the channel ch5, the type is VO (voice), the localization is 0 degree, the reverberation is 0%, and the bit rate is 64 kbps.

As shown in FIG. 5, the processed control signal describes the time stamp corresponding to the control signal and the configuration of processed sound data which is transferred by means of each channel for each channel (L, R, SL, SR, and C). Specifically, the configuration refers to the contents of the type, sound effect, and bit rate of original sound allocated to each piece of processed sound data.

For example, in the processed control signal shown in FIG. 5(*a*), the time stamp is t=0.0 second, the type of original sound data which is transmitted from the channel L is BGM (L) and SE (ambient sound), and the sound effect is 0%. In regard to original sound data which is transmitted from the channel SL, the type is SE (ambient sound), the sound effect is 12%, and the bit rate is 64 kbps.

1-5. Functional Configuration of Processing Unit

Figure 6:
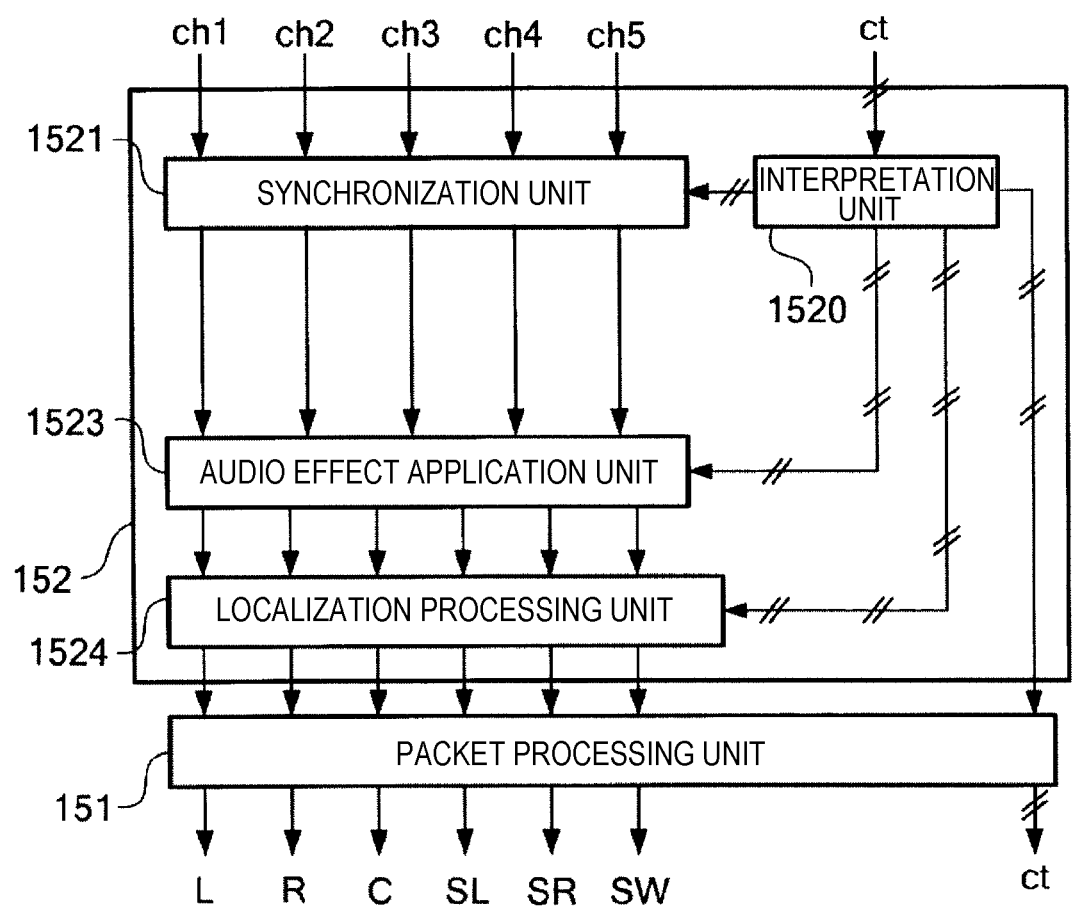
FIG. 6 is a diagram showing the functional configuration of a processing unit.

FIG. 6 is a diagram showing the functional configuration of the processing unit 152. The processing unit 152 functions as an interpretation unit 1520, a synchronization unit 1521, a sound effect application unit 1523, and a localization processing unit 1524. The interpretation unit 1520 interprets the control signal generated by the control signal generation unit 112. That is, the interpretation unit 1520 reads the time stamp included in the control signal and sends the time stamp to the synchronization unit 1521. The synchronization unit 1521 searches for original sound data associated with a time stamp corresponding to the time stamp sent from the interpretation unit 1520 or a time stamp indicating the time after the time indicated by the time stamp from among original sound data generated by the original sound data generation unit 111. The original sound data is sequentially sent to the sound effect application unit 1523 and the localization processing unit 1524.

The interpretation unit 1520 reads the parameters of the reverberation rate and the localization of original sound data transmitted from the channels ch1 to ch5 from the control signal, and sends the parameters to the sound effect application unit 1523 and the localization processing unit 1524.

The interpretation unit 1520 generates the processed control signal from the interpreted control signal and sends the processed control signal to the audio processor 2.

The sound effect application unit 1523 acquires the reverberation rate of each piece of original sound data transmitted from the channels ch1 to ch5 from the interpretation unit 1520, and performs reverberation processing at the reverberation rate. That is, the reverberation at the reverberation rate is applied to the original sound data to generate sound data (referred to as first processed sound data) indicating first processed sound.

The localization processing unit 1524 acquires the localization of each piece of generated first processed sound data from the interpretation unit 1520, and sets the sound pressure of sound to be emitted in the sound emission device 3 such that a sound image is located at the localization when it is assumed that the sound emission device 3 has the standard sound emission conditions. Accordingly, the localization processing unit 1524 generates sound data (referred to as second processed sound data) indicating second processed sound from the first processed sound data.

The second processed sound data is packetized by the packet processing unit 151, and transmitted to the audio processor 2 through the six channels L, R, C, SL, SR, and SW based on the standard sound emission conditions.

1-6. Configuration of Audio Processor

Figure 7:
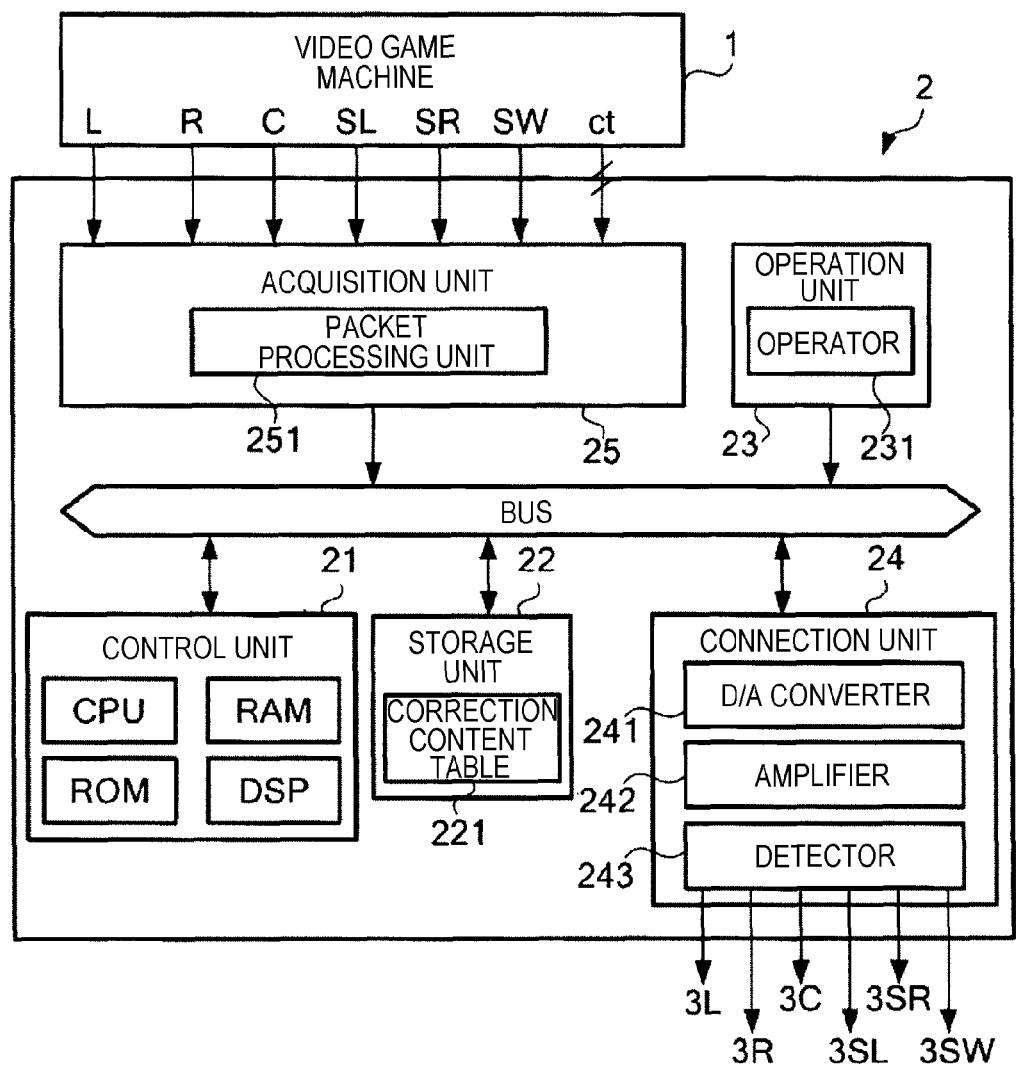
FIG. 7 is a diagram showing the configuration of an audio processor.

FIG. 7 is a diagram showing the configuration of the audio processor 2. A control unit 21 has a CPU, a ROM, and a RAM, and controls the respective units of the audio processor 2 using the CPU which reads and executes a boot loader stored in the ROM or a control program stored in the storage unit 22 on the RAM. The control unit 21 includes a DSP (Digital Signal Processor) which corrects processed sound data (second processed sound data) acquired through an acquisition unit 25.

A storage unit 22 is high-capacity storage means, such as a hard disk drive, and stores a control program which is read into the control unit 21. The storage unit 22 stores a correction content table 221. The correction content table 221 is a table in which the contents of correction processing for correcting processed sound data (second processed sound data) processed according to the content of processing corresponding to the standard sound emission conditions in the video game machine 1 in accordance with the difference between the device sound emission conditions of the sound emission device 3 to which the audio processor 2 is connected and the standard sound emission conditions are described.

The storage unit 22 may be a recording medium, such as an external nonvolatile memory. In this case, the storage unit 22 is connected to the audio processor 2 through a connection interface (not shown) or the like.

An operation unit 23 includes an operator 231 which gives various instructions. The operation unit 23 receives user operation and supplies an operation signal according to the operation content to the control unit 21.

An acquisition unit 25 has a packet processing unit 251, and the packet processing unit 251 acquires a plurality of packets individually sent from the six channels L, R, C, SL, SR, and SW, extracts divided second processed sound data from each acquired packet, and combines the divided second processed sound data to acquire original second processed sound data. That is, the acquisition unit 25 having the packet processing unit 251 functions as a processed sound data acquirer that is adapted to acquire processed sound data, which is obtained by processing original sound data according to the content of processing corresponding to the standard sound emission conditions of the sound emission device, from any channel of a plurality of channels. The time stamp included in the header of the original packet is associated with the acquired second processed sound data.

The acquisition unit 25 acquires the processed control signal output from the output unit 15 of the video game machine 1. That is, the acquisition unit 25 functions as a control signal acquirer that is adapted to acquire control signal (processed control signal) which includes information indicating the configuration of processed sound data obtained by processing original sound data by means of the parameter indicating the content of processing on original sound data.

A connection unit 24 includes a D/A converter 241 and an amplifier 242. The D/A converter 241 converts processed sound data generated by the control unit 21 to analog data to acquire processed sound. The amplifier 242 amplifies the acquired processed sound and transmits the processed sound to the six sound emission devices 3 (3L, 3R, 3C, 3SL, 3SR, 3SW) for sound emission. The connection unit 24 includes a detector 243 which detects the device sound emission conditions of the six sound emission devices 3 centering on the position of the user. Specifically, the detector 243 detects the number of sound emission devices 3 which are connected to the audio processor 2, the angle and distance of each sound emission device 3 with respect to the listening position of the user, and the sound range in which sound can be emitted by the sound emission device 3. The device sound emission conditions of each sound emission device 3 detected by the detector 243 are transferred to the control unit 21. The detector 243 acquires test sound using a sound acquirer at a listening point to calculate the disposition of the speakers from the delay time of the sound or the attenuation rate of the sound pressure or emits an infrared ray or the like toward a reflecting seal attached to the speaker while revolving from the listening point to measure the distance and angle, thereby detecting the direction in which each speaker is placed. The detector 243 may detect the device sound emission condition input in advance by user operation as the device sound emission conditions of the sound emission device 3.

The control unit 21 first acquires the device sound emission conditions of the sound emission device 3 detected by the detector 243 of the connection unit 24. Second, the control unit 21 acquires the second processed sound data acquired by the acquisition unit 25 and the processed control signal which includes information indicating the configuration of the second processed sound data. Third, the control unit 21 refers to the correction content table 221 of the storage unit 22, and determines the contents of correction processing in accordance with the difference between the acquired device sound emission conditions and the standard sound emission condition, and the acquired processed control signal. Fourth, the control unit 21 performs correction processing based on the contents determined for the acquired processed sound data.

1-7. Functional Configuration of Audio Processor

FIG. 8 is a diagram showing the functional configuration of mainly the control unit 21 of the audio processor. The control unit 21 functions as an identification unit 210, a synchronization unit 211, a sound quality correction unit 212, and a sound effect correction unit 213. The identification unit 210 acquires the processed control signal acquired by the acquisition unit 25 and the device sound emission conditions of the sound emission device 3 detected by the detector 243 of the connection unit 24. The identification unit 210 refers to the correction content table 221 of the storage unit 22, and in order to make sound (hereinafter, referred to as second sound) emitted by the sound emission device 3 under the acquired device sound emission conditions close to the first sound, identifies the correction contents of the second processed sound data based on the difference between the device sound emission conditions and the standard sound emission conditions, the processed control signal, and the second processed sound data acquired in association with the sound emission device 3.

The correction content table 221 will be described. FIG. 9 is a table showing an example of the correction content table 221 which is stored in the storage unit 22. As shown in FIG. 9, the correction content table 221 describes correction conditions which describe the conditions to be determined by the identification unit 210 in association with the correction contents identified when the identification unit 210 determines that the correction conditions are satisfied. Accordingly, the identification unit 210 determines the conditions described in the correction conditions, and identifies the correction contents in accordance with the determination result.

For example, the condition "lack" shown in FIG. 9 indicates the condition that the sound emission device 3 which is present under the standard sound emission conditions is lacking under the device sound emission conditions. At this time, as the correction content, "allocate to close sound emission device" of processed sound data is identified by the identification unit 210. That is, the correction content becomes processing for allocating processed sound data allocated to the sound emission device 3, which is lacking under the device sound emission conditions, to a different sound emission device 3 disposed close to the sound emission device 3 when viewed from a position where the sound emission device 3 should be present under the standard sound emission conditions.

The condition "lack of sound range reproduction ability" shown in FIG. 9 indicates the condition that, while the sound emission device 3 which is present under the standard sound emission conditions is present under the device sound emission conditions, the sound emission device 3 under the device sound emission conditions is lacking in reproduction ability in any sound range compared to the sound emission device 3 under the standard sound emission conditions. At this time, as the correction content, "allocate to close sound emission device" of processed sound data is identified by the identification unit 210. That is, the correction content becomes processing for allocating processed sound data to a different sound emission device 3 close to the sound emission device 3 only for a sound range in which reproduction ability is lacking under the device sound emission conditions.

Returning to FIG. 7, the identification unit 210 reads the time stamp included in the processed control signal and sends the time stamp to the synchronization unit 211. The synchronization unit 211 searches for the second processed sound data associated with a time stamp corresponding to the time stamp sent from the identification unit 210 or a time stamp indicating the time after the time indicated by the time stamp from among the second processed sound data acquired from the acquisition unit 25 through the channels L, R, C, SL, SR, and SW. The second processed sound data is sequentially sent to the sound quality correction unit 212 and the sound effect correction unit 213.

The identification unit 210 sends the identified correction contents to the sound quality correction unit 212 and the sound effect correction unit 213.

The sound quality correction unit 212 reads the configuration of processed sound data from the processed control signal, and when the bit rate is lower than a threshold value, performs sound quality improvement processing according to the bit rate value on processed sound data. Accordingly, the sound quality correction unit 212 performs sound quality improvement processing on the second processed sound data to generate sound data (referred to as third processed sound data) indicating third processed sound.

When the intensity of reverberation under the device sound emission conditions of the sound emission device 3 detected by the detector 243 is different from the intensity of reverberation under the standard sound emission conditions, the sound effect correction unit 213 removes or adds reverberation in accordance with the difference. For example, when the intensity of reverberation under the device sound emission conditions is stronger than the intensity of reverberation under the standard sound emission conditions, the reverberation applied in the video game machine 1 becomes excessive. Thus, in order to resolve an excessive reverberation, the sound effect correction unit 213 removes the reverberation applied to the third processed sound data in accordance with a predetermined algorithm. On the contrary, when the intensity of reverberation under the device sound emission conditions is weaker than the intensity of reverberation under the standard sound emission conditions, the reverberation applied in the video game machine 1 is insufficient. In this case, in order to resolve an insufficient reverberation, the sound effect correction unit 213 newly adds reverberation on the third processed sound data. In this way, the sound effect correction unit 213 removes or adds the reverberation of the third processed sound data to generate sound data (referred to as fourth processed sound data) indicating fourth processed sound.

The fourth processed sound data is transmitted from the connection unit 24 to the sound emission devices 3 (3L, 3R, 3C, 3SL, 3SR, and 3SW) through the six channels L, R, C, SL, SR, and SW.

2. Operation

Next, the operation of the audio processing system 9 will be described based on the control signal shown in FIG. 4 as an example. The operation is divided into an operation relating to processing of original sound data in the video game machine 1 and an operation relating to correction of processed sound data in the audio processor 2.

2-1. Operation of Video Game Machine

The video game progression unit 110 reads a plurality of pieces of video data and sound data from the storage unit 12 along the video game program 121 to start the video game, and if the control signal shown in FIG. 4(a) is generated by the control signal generation unit 112, the processing unit 152 of the output unit 15 processes original sound data generated by the original sound data generation unit 111 based on the parameter included in the generated control signal to generate a plurality of pieces of processed sound data. The configuration of the processed sound data is as shown in the processed control signal of FIG. 5(a).

For example, at the time of the start of the video game (that is, t=0.0), original sound which is transferred through the channel ch1 is localized at an angle of 45 degrees from the user, and the reverberation of 12% is applied.

Next, when 2.5 seconds have elapsed from the start of the video game, the control signal shown in FIG. 4(b) is generated by the control signal generation unit 112. When receiving the control signal, the audio processor 2 searches for and processes each piece of original sound data at t=2.5. A portion indicated by a thick frame in FIG. 4(b) is a portion which is changed from the control signal at t=0.0. Specifically, the localization and reverberation rate of the channel ch3 and the localization of the channel ch5 are changed. Accordingly, for example, at the time of t=2.5 seconds, original sound which is transferred through the channel ch3 is localized at an angle of 30 degrees from the user, and the reverberation of 12% is applied. The configuration of the processed sound data is as shown in the processed control signal of FIG. 5(b).

Next, when 10.0 seconds have elapsed from the start of the video game, the control signal shown in FIG. 4(c) is generated by the control signal generation unit 112. Here, the video game machine 1 is temporarily in a state where operation to move the game character is not received from the operation unit 13. For example, for the time for explaining the story in the video game or the standby time for loading the video game program 121 corresponding to the next stage, the video game machine 1 does not receive any operation excluding operation on the video game system, such as operation for force-quit, and BGM is played when a motion image or a letter screen is displayed on the display unit 14. At this time, since the game character on the video game does not have a talk, as shown in FIG. 5(b), the channel SL heretofore allocated to "VO" as voice is empty. Accordingly, the video game progression unit 110 allocates BGM to all of the channels L, R, SL, and SR as shown in FIG. 5(c), and allocates system sound (SYS), which is generated when there is operation on the video game system, to the channels L and R.

The output unit 15 transmits a plurality of pieces of processed sound data generated in the above-described manner and the control signal used for processing the processed sound data to the audio processor 2.

As described above, since the video game machine 1 outputs the processed sound data processed such that the first sound is emitted under the standard sound emission conditions and the processed control signal which includes information indicating the configuration of the processed sound data, the audio processor 2 which receives the processed sound data and the processed control signal can identify the configuration of the processed sound data. The audio processor 2 can identify the correction contents necessary for processed sound data based on the difference between the actual device sound emission conditions and the standard sound emission conditions such that the first sound is emitted to the sound emission device having the device sound emission conditions.

Even when the audio processor 2 cannot identify the correction contents from data acquired from the video game machine 1, the video game machine 1 processes original sound data such that the first sound is emitted under the standard sound emission conditions. Accordingly, when the device sound emission conditions of the sound emission device 3 connected to the audio processor 2 are close to the standard sound emission conditions, the video game machine 1 just supplies processed sound data having not been corrected by the audio processor 2 to the sound emission device 3, thereby allowing sound close to the first sound to be emitted to the sound emission device 3. That is, the average sound emission conditions from among a plurality of sound emission devices 3 are determined and defined as the standard sound emission conditions, thereby suppressing shift in processed sound data based on the difference from the device sound emission conditions.

The video game machine 1 may be connected to a plurality of audio processors 2. In this case, even when the sound emission device 3 connected to each audio processor 2 differs under the device sound emission conditions, processed sound data output from the video game machine 1 is corrected in each audio processor 2 in accordance with the device sound emission conditions. Accordingly, it is not necessary that the video game machine 1 individually generates and outputs processed sound data processed according to different contents of processing to a plurality of audio processors 2.

2-2. Operation of Audio Processor

When the processed control signal is received from the video game machine 1, the control unit 21 of the audio processor 2 searches for each piece of processed sound data reconstructed from the packet corresponding to the time stamp of the processed control signal, determines the content of correction processing based on the correction content table 221 stored in the storage unit 22 and the processed control signal, and corrects each piece of processed sound data.

FIG. 10 is a diagram illustrating the outline of correction processing. A black circle shown in FIG. 10(a) indicates the disposition of the sound emission device 3 under the standard sound emission conditions, and a broken line indicates the actual disposition of the sound emission device 3. For example, as shown in FIG. 10(a), the device sound emission conditions of the sound emission device 3 connected to the audio processor 2 are different from the standard sound emission conditions depending on the shape or size of a room. A solid line shown in FIG. 10(b) indicates reproduction ability for the sound range of the sound emission device 3C under the standard sound emission conditions, and a broken line indicates reproduction ability for the sound range of the sound emission device 3C under the actual device sound emission conditions. That is, in regard to the ability of each sound emission device 3, the actual device sound emission conditions may be different from the standard sound emission conditions. The audio processor 2 corrects the acquired processed sound data so as to compensate for the difference between the actual device sound emission conditions and the standard sound emission conditions, and emits sound to the sound emission device 3 based on processed sound data after correction.

A specific example of correction processing will be described below.

(1) Presence/Absence of Sound Emission Device 3

Although in the standard sound emission conditions, the sound emission device 3 (3L, 3R, 3C, 3SL, 3SR, and 3SW) corresponding to the six channels L, R, C, SL, SR, and SW are defined, all of the six sound emission devices 3 may not be actually used, or seven or more sound emission devices may be present. The correction content table 221 stored in the storage unit 12 describes the content of correction processing for allocating processed sound data for emitting sound to the sound emission device 3C to the sound emission device 3L and the sound emission device 3R such that the sound image of processed sound indicated by the processed sound data is localized at a position where the sound emission device 3C is supposed to be present under the standard sound emission conditions, for example, when the sound emission device 3C which expresses a sound source from the front center under the standard sound emission conditions is not present in the actually connected sound emission devices 3.

Accordingly, if the detector 243 of the connection unit 24 detects that the sound emission device 3C is not present, the control unit 21 references the correction content table 221, and the processing unit 152 allocates processed sound data allocated to the sound emission device 3C (that is, the channel C) to the sound emission device 3L and the sound emission device 3R, sets the sound pressure of processed sound indicated by each piece of processed sound data, and emits sound. The set sound pressure is 50% of the sound pressure of processed sound which will be intrinsically emitted in the sound emission device 3C. The ratio of the sound pressure or the like is determined based on the processed control signal.

When there is no surround speaker (the sound emission device 3SL and the sound emission device 3SR), similarly, the control unit 21 allocates processed sound data of processed sound, which will be emitted to the sound emission device 3SL and the sound emission device 3SR, to the sound emission device 3L and the sound emission device 3R as correction processing. The ratio of the sound pressure or the like of processed sound indicated by the processed sound data is determined based on the processed control signal.

When there is no subwoofer (the sound emission device 3SW), the control unit 21 allocates processed sound data of processed sound, which will be emitted to the sound emission device 3SW, to the sound emission device 3L and the sound emission device 3R as correction processing. At this time, the detector 243 detects the low-frequency reproduction ability of the sound emission device 3L and the sound emission device 3R, and if it is determined that the degree of influence on the emission of processed sound is low, omits the emission of processed sound or sets a low sound pressure.

(2) Ability of Sound Emission Device 3

The detector 243 detects the ability of each sound emission device 3 and transfers the content to the control unit 21. For example, it is assumed that, by comparison with a threshold value set in advance, the detector 243 detects that the sound emission device 3R has sufficient low-frequency reproduction ability, and detects that the sound emission device 3SR does not have low-frequency reproduction ability. Here, if original sound data is processed by the processing unit 152 such that the user feels that the sound image of any type of original sound is moving from the position of the sound emission device 3R to the position of the sound emission device 3SR under the standard sound emission conditions, the control unit 21 divides processed sound data transmitted through the channel SR for each range through a filter, such as a high-pass filter or a low-pass filter with the movement of the sound image with reference to the processed control signal, and corrects processed sound data such that processed sound in the middle-high range from among processed sound indicated by the divided processed sound data is emitted to the sound emission device 3SR, and processed sound corresponding to a low-frequency component is emitted to the sound emission device 3SW. Instead of performing the division processing, sound emission using the sound emission device 3SW may not be performed.

The control unit 21 identifies the difference between the ability of each sound emission device 3 under the standard sound emission conditions and the ability of each sound emission device 3 under the device sound emission conditions, and performs corresponding sound quality improvement processing or sound effect application. For example, when the detector 243 acquires test sound emitted to each sound emission device 3 using sound acquisition means, and detects "intensity of reverberation" which is one of the ability of each sound emission device 3, the control unit 21 compares the intensity of reverberation with the intensity of reverberation defined in advance under the standard sound emission conditions, and when the intensity of reverberation under the device sound emission conditions is stronger than the intensity of reverberation under the standard sound emission conditions, performs processing for removing the reverberation of processed sound data applied through processing in the video game machine 1. On the contrary, when the intensity of reverberation under the device sound emission conditions is weaker than the intensity of reverberation under the standard sound emission conditions, the control unit 21 performs processing for adding reverberation to processed sound data acquired from the video game machine 1. Accordingly, deviation in the sound effect which occurs depending on whether the reverberation in an actual room is greater or smaller than a virtual room which is supposed as standard is reduced.

(3) Disposition of Sound Emission Device 3

For example, when the front for the user at the listening position is 0 degree, and the disposition of each sound emission device 3 is represented by an increasing angle in the counterclockwise direction from above the head of the user, it is assumed that, under the standard sound emission conditions, the sound emission device 3C is disposed at 0 degree, and the sound emission device 3L is disposed at 45 degrees. Here, if the control signal is provided to localize any original sound at 30 degrees, the localization is between the sound emission device 3C and the sound emission device 3L, and closer to the sound emission device 3L than the sound emission device 3C. For this reason, the video game machine 1 generates processed sound data such that the original sound is emitted to the sound emission device 3L at a higher sound pressure (for example, two times) than the sound emission device 3C.

Here, it is assumed that the detector 243 detects that the actual sound emission device 3C is disposed at 0 degree, and the actual sound emission device 3L is disposed at 60 degrees. When this happens, since the angle at which the control signal will localize original sound is 30 degrees, this is just the middle between the actual sound emission device 3C and the sound emission device 3L. Nevertheless, if processed sound data generated by the video game machine 1 is used as it is, the above-described original sound is emitted to the sound emission device 3L at a higher sound pressure than the sound emission device 3C, such that the original sound is localized at a position of an angle greater than a position where the original sound will be localized. Accordingly, as correction processing, the control unit 21 corrects processed sound data such that the sound pressure of processed sound emitted by the sound emission device 3C and the sound emission device 3L becomes equal.

For example, when the video game machine executes video game software, such as a role-playing game, a game character, words which are spoken by the game character, how sound echoes, and the direction in which sound is heard change depending on the progress of the video game, such as selection of a member who goes with the game character, selection of a dungeon, or selection of the direction of the face of the game character. There are various ways to listen sound depending on the type of the sound, and the ways to listen sound change depending on the actual device sound emission conditions of the sound emission device. Accordingly, if a sound effect is applied without exception at a stage where the device sound emission conditions under which sound is emitted are not known, unintended sound may be heard by the user in the actual sound emission device. However, since an information processor, such as a video game machine, which reproduces software or contents should emit sound included in the contents under various device sound emission conditions, in general, data indicating the sound is processed based on the standard sound emission conditions without exception and output to the audio processor. For this reason, when the device sound emission conditions of the sound emission device connected to the audio processor are apart from the standard sound emission conditions, sound to be emitted may be affected.

In the audio processing system 9, as described above, processed sound data which is data after processing and the control signal which includes information indicating the configuration of the processed sound data are sent to the audio processor 2, and the audio processor 2 corrects processed sound data based on the corresponding parameter and the difference between the device sound emission conditions of the connected sound emission device and the standard sound emission conditions, thereby reducing the effect on sound emission due to the difference.

3. Modifications

Although the embodiment has been described, the content of the embodiment may be modified as follows. Further, the following modifications may be combined.

(1) Although in the foregoing embodiment, the output unit 15 transmits processed sound data as PCM data to the channels L, R, C, SL, SR, and SW, compressed, processed sound data may be transmitted. In this case, the control signal may include information indicating a compression format or a compression rate of compression processing on original sound data transmitted through each channel.

(2) Although in the foregoing embodiment, the output unit 15 packetizes processed sound data processed by the processing unit 152 using the packet processing unit 151 as it is, encryption may be performed before packetization. For example, the output unit 15 may include a processor which performs encryption processing based on the HDCP (High-bandwidth Digital Content Protection) protocol, and the encryption function may be realized by the CPU. In this case, a mechanism for decrypting codes may be provided in the acquisition unit 25 of the audio processor 2.

(3) Although in the foregoing embodiment, the control signal generation unit 112 generates the processed control signal in which the overall configuration of all pieces of processed sound data is described for each time stamp, a processed control signal in which only the configuration with changes is described may be generated. That is, only a portion indicated by a thick frame in FIGS. 4(*b*) and 4(*c*) may be transmitted as a processed control signal to the audio processor 2 in association with each time stamp. In this case, the audio processor 2 may not change the channels and parameters not included in the transmitted processed control signal.

(4) Although in the foregoing embodiment, the configuration in which original sound data is transmitted to the audio processor 2 is the video game machine 1, a configuration other than the video game machine may be provided. For example, a reproducer which reproduces a motion image recorded in a DVD video may be provided. In this case, the reproducer switches video to be displayed in accordance with user operation, and switches the processed control signal corresponding to each piece of processed sound data to be transmitted to the audio processor 2 in accordance with user operation. For example, when there is a video data captured at a multi-angle, the localization of sound (processed sound) which should be emitted may be obtained in accordance with an angle selected by the user, processed sound data according to the localization may be generated under the standard sound emission conditions, and the configuration of the generated processed sound data may be transmitted to the audio processor 2 along with the processed control signal. The audio processor 2 may correct processed sound data so as to adapt to the sound emission device 3 connected to the audio processor 2 with reference to the processed sound data, the processed control signal, the device sound emission conditions of the sound emission device 3 detected by the detector 243, and the standard sound emission conditions. Accordingly, when it is assumed that the face of the user is directed at the angle selected by the user, the audio processor 2 can increase the possibility that the sound image approaches in the direction in which sound should be heard.

(5) Although in the foregoing embodiment, processed sound data and the control signal which is used to generate the processed sound data are output from the single video game machine 1, an information processor, such as the video game machine 1, may output processed sound data, and may not output the corresponding processed control signal. In this case, the audio processor 2 may acquire the processed control signal from a device other than the information processor.

Figure 11:
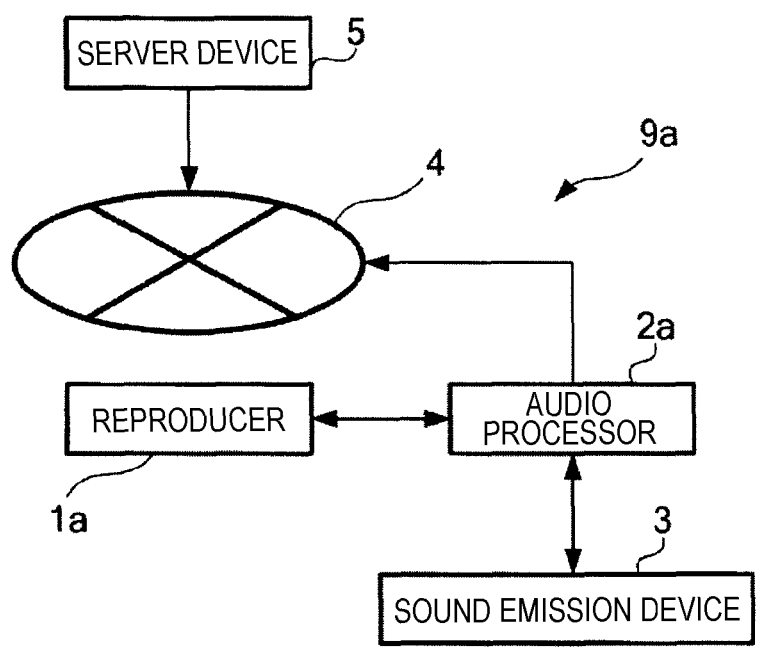
FIG. 11 is a diagram showing an audio processing system according to a modification.

FIG. 11 is a diagram showing an audio processing system 9a according to a modification. The audio processing system 9a has a reproducer 1a, an audio processor 2a, a sound emission device 3, a network 4, and a server device 5. The reproducer 1a is a device which reproduces motion image contents of a DVD video or the like. The reproducer 1a functions as an information processor including a generator that is adapted to generate original sound data indicating original sound and a parameter indicating the content of processing on the original sound data in accordance with user operation, a processed sound data generator that is adapted to process original sound data generated by the generator according to the content of processing indicated by the parameter to generate processed sound data, and a processed sound data output section that is adapted to output processed sound data generated by the processed sound data generator from any channel of a plurality of channels. That is, the reproducer 1a is the same as the video game machine 1 in the foregoing embodiment except that there is no configuration corresponding to a control signal output section that is adapted to output a control signal which includes information indicating the configuration of processed sound data obtained by processing original sound data by means of a parameter indicating the content of processing on original sound data, and when reproduction of a motion image content starts, the identification information of the motion image content is output to the audio processor 2a. The sound emission device 3 has the same configuration as the foregoing embodiment.

The audio processor 2a is connected to the server device 5 through the network 4. If the identification information of the motion image content is received from the reproducer 1a, the audio processor 2a request the server device 5 for a processed control signal defined in advance for the motion image content identified by the received identification information. The server device 5 transmits the requested processed control signal to the audio processor 2a in response to the request. The processed control signal describes information indicating the configuration of processed sound data obtained by processing original sound data by means of the parameter indicating the corresponding content of processing under the standard sound emission conditions. The audio processor 2a receives the processed control signal from the server device 5, and identifies the processed control signal corresponding to the progress of the motion image content with reference to the time stamp attached to the processed control signal. The audio processor 2a corrects processed sound data with reference to processed sound data output from the reproducer 1a, the identified processed control signal, the device sound emission conditions of the sound emission device 3 detected by the detector, and the standard sound emission conditions. Accordingly, as in the foregoing embodiment, the audio processor 2a can correct processed sound data processed by means of the parameter indicating the corresponding content of processing under the standard sound emission conditions close to processed sound data when being processed based on the device sound emission conditions of the sound emission device 3 connected to the audio processor 2a.

(6) Each program which is executed in the control unit 11 of the video game machine 1 and the control unit 21 of the audio processor 2 may be provided in the form of being stored in a computer-readable recording medium, such as a magnetic recording medium, for example, a magnetic tape or a magnetic disk, an optical recording medium, such as an optical disk, a magneto-optical recording medium, or a semiconductor memory. The program may be downloaded through a network, such as Internet. In regard to the control unit 11 and the control unit 21, various devices other than the CPU may be applied as control means illustrated by the CPU, and for example, a specialized processor or the like may be used.

(7) Although in the foregoing embodiment, the output unit 15 includes the processing unit 152 which processes original sound data obtained from the original sound data generation unit 111, a function of processing original sound data may be realized by the control unit 11 which executes the above-described program.

(8) Although in the foregoing embodiment, the video game machine 1 has the display unit 14 which displays video according to the progress of the video game, the video game machine 1 may not have the display unit 14. For example, the video game machine 1 may execute video game software which deals with sound and does not display video, or may include a video terminal which is connected to an external display device and through which a video signal is supplied to a display device.

(9) Although in the foregoing embodiment, the audio processing system 9 includes the six sound emission devices 3, and realizes so-called 5.1 ch surround sound emission, more sound emission devices 3 or less sound emission devices 3 may be provided. For example, the sound emission devices 3 may be provided to correspond to the 7.1 ch system or the 2.1 ch system.

(10) Although in the foregoing embodiment, the control signal generation unit 112 generates the parameter indicating the content of processing on original sound data according to the progress of the video game, the parameter may be generated based on information acquired from the audio processor 2. In this case, the control unit 11 of the video game machine 1 has channels (hereinafter, referred to as acquisition channels) through which data is acquired from the audio processor 2, as well as the channels through which data is output to the audio processor 2, the control unit 11 acquires the device sound emission conditions, such as the number of sound emission devices 3 connected to the audio processor 2, the position, or low-frequency reproduction ability, through the acquisition channels. That is, the control unit 11 functions as a sound emission condition acquirer that is adapted to acquire the sound emission conditions of the sound emission device, which is forced to emit sound by the audio processor, from the audio processor as an output destination to which the processed sound data output means outputs processed sound data.

The control signal generation unit 112 may determine the content of processing according to the sound emission conditions acquired from the acquisition channels, and may generate the parameter. The processing unit 152 may acquire the parameter generated by the control signal generation unit 112, may process each piece of original sound data generated by the original sound data generation unit 111 based on the acquired parameter, and may generate a plurality of pieces of processed sound data.

In this case, the audio processor 2 transmits a signal indicating the device sound emission conditions of the sound emission device 3 detected by the detector 243 to the video game machine 1 through the acquisition channels. When processed sound data acquired by the acquisition unit 25 of the audio processor 2 is obtained by processing original sound data according to the content of processing defined such that the first sound is emitted under the device sound emission conditions indicated by the signal by the processing unit 152 of the video game machine 1 which receives the signal, the control unit 21 may not determine the content of correction processing on the processed sound data and may not perform correction processing. As a result, the control unit 21 may supply uncorrected processed sound data from the connection unit 24 to each sound emission device 3.

The determination on whether or not the acquired processed sound data is processed according to the content of processing defined such that the first sound is emitted under the device sound emission conditions may be made based on, for example, the processed control signal acquired by the acquisition unit 25. In this case, when the processing unit 152 of the video game machine 1 generates the processed sound data by processing original sound data according to the content of processing defined such that the first sound is emitted under the device sound emission conditions indicated by the signal transmitted from the audio processor 2, the processing unit 152 may include flag information indicating the effect in the processed control signal associated with the processed sound data. Accordingly, when the flag information is included in the processed control signal acquired by the acquisition unit 25, the control unit 21 of the audio processor 2 may determine that processed sound data associated with the processed control signal is processed according to the content of processing defined such that the first sound is emitted under the device sound emission condition, and may perform correction processing on the processed sound data.

(11) Although in the foregoing embodiment, the video game progression unit 110 progresses the video game according to user operation along the video game program 121, the content of the video game program 121 may be, for example, as follows.

The video game program 121 describes a virtual space, and a game character and a sound generating object which are disposed in the virtual space. Data which expresses the virtual space, the game character, and the sound generating object is stored on the RAM of the control unit 11 when the video game program 121 is read by the control unit 11 and executed. If user operation is received, the video game progression unit 110 performs calculation according to the operation to change data on the RAM. Accordingly, the game character in the virtual space is operated in accordance with user operation, and the video game is progressed. The operated game character takes a posture according to user operation in the virtual space or moves to a position according to the operation.

For a game character which is disposed in the virtual space, the listening position where sound emitted in the virtual space is heard is defined. The original sound data generation unit 111 calculates and generates original sound data indicating original sound set for a sound generating object from the relationship between the listening position defined for the game character and the sound generating object disposed in the virtual space. The processing unit 152 of the output unit 15 generates a plurality of pieces of processed sound data according to the progress of the video game by processing a plurality of pieces of original sound data calculated and generated by the original sound data generation unit 111. The packet processing unit 151 of the output unit 15 packetizes the generated processed sound data and outputs the packets to the audio processor 2 by means of the individual channels. The control signal generation unit 112 generates a control signal which includes a parameter indicating the content of processing of each piece of original sound data in association with the identification information of each piece of original sound data. The parameter is determined in accordance with the progress of the video game and user operation, and how the user listens to original sound indicating the original sound data by means of the parameter is designated. The output unit 15 outputs the generated control signal to the audio processor 2.

(12) Although in the foregoing embodiment, the number of pieces of original sound data which are generated simultaneously by the original sound data generation unit 111 is a maximum of five, the number of pieces of original sound data may be equal to or smaller than four, or equal to or greater than six.

(13) Although in the foregoing embodiment, the processing unit 152 of the video game machine 1 generates information indicating the configuration of processed sound data obtained by processing original sound data by means of the parameter acquired from the control signal generation unit 112, and outputs the processed control signal including the information to the audio processor 2 through the packet processing unit 151, the processed control signal may not be output to the audio processor 2. In this case, the audio processor 2 may acquire the control signal generated by the control signal generation unit 112 instead of the processed control signal.

Figure 12:
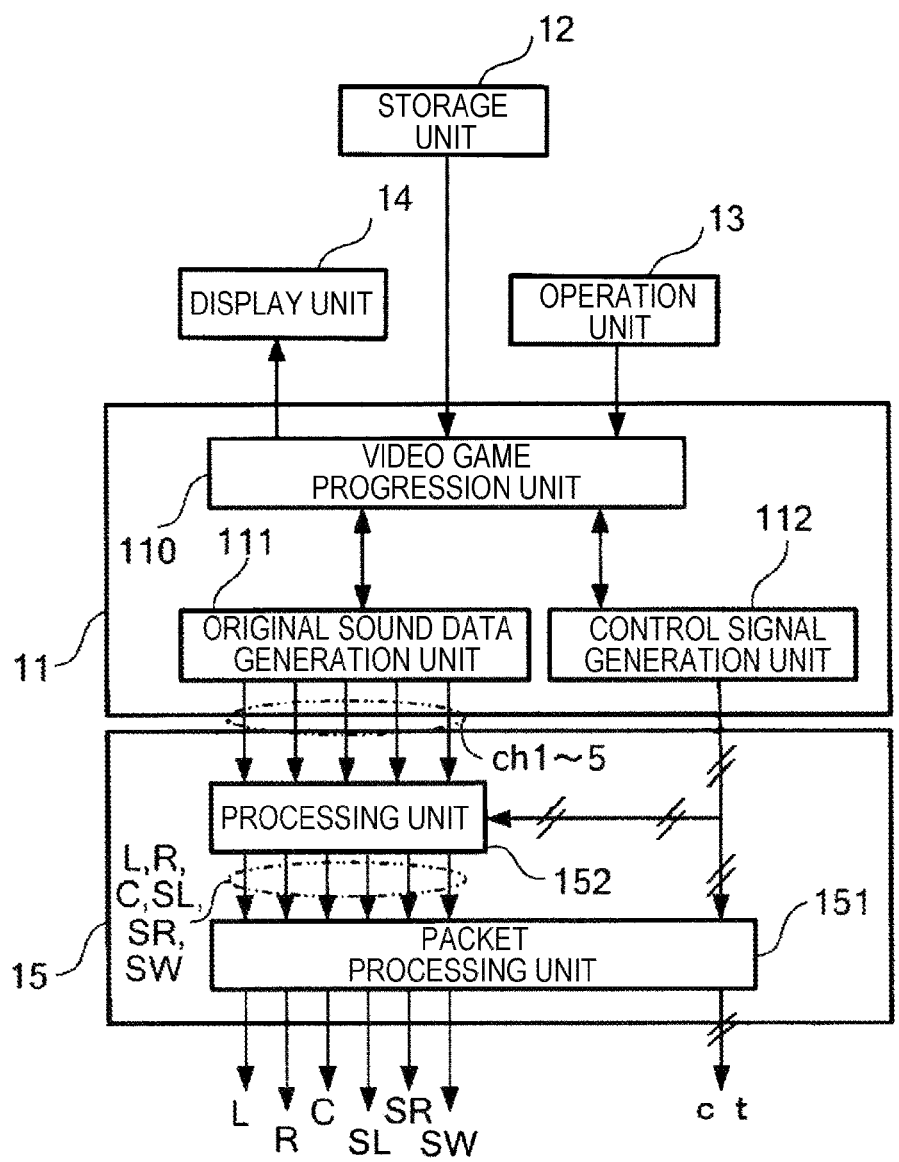
FIG. 12 is a diagram showing the functional configuration of a video game machine according to a modification.
Figure 13:
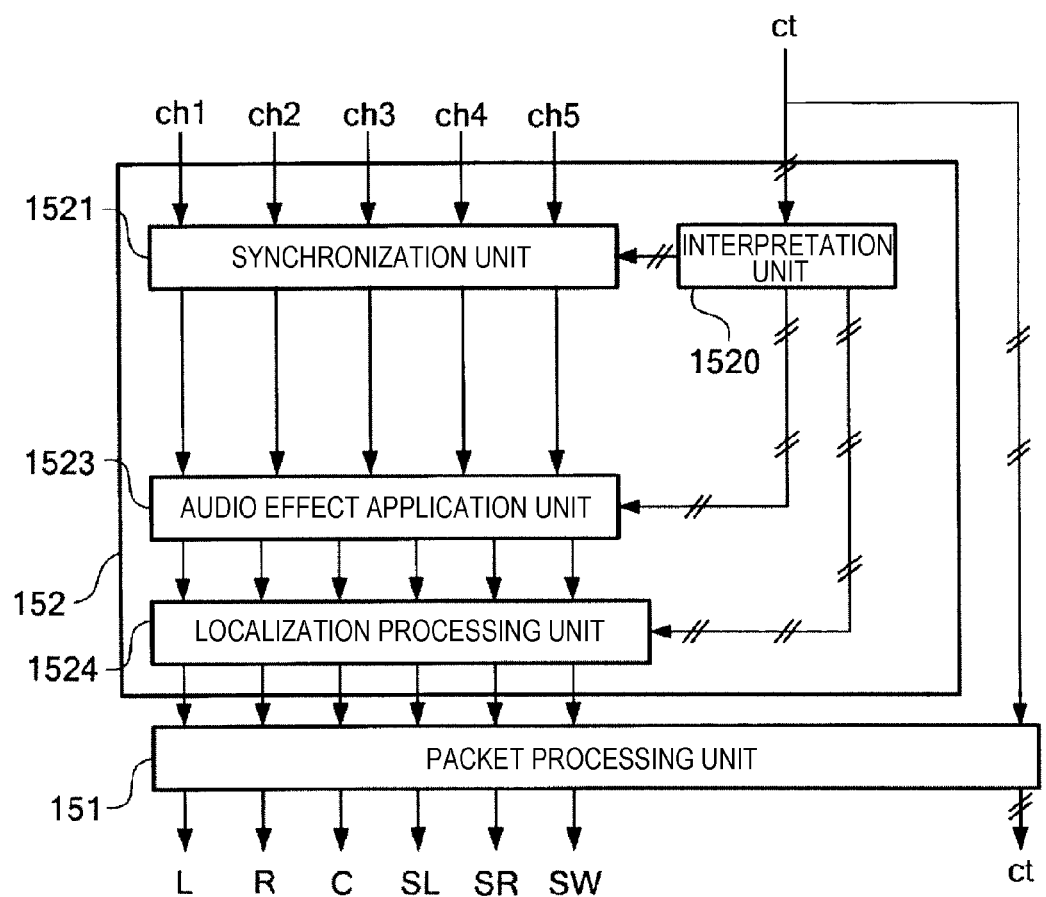
FIG. 13 is a diagram showing the functional configuration of a processing unit according to a modification.

FIG. 12 is a diagram showing the functional configuration of the video game machine 1 according to the modification. FIG. 13 is a diagram showing the functional configuration of the processing unit 152 according to the modification. In this way, the control signal generated by the control signal generation unit 112 is supplied to the processing unit 152 and used to process original sound data, and is output to the audio processor 2 through the packet processing unit 151 without being changed to the processed control signal. Since the control signal includes the parameter indicating the content of processing on original sound data according to the progress of the video game, the control unit 21 can more accurately identify the correction contents of processed sound data.

For example, when there is the difference between the disposition under the device sound emission conditions of the sound emission device 3 detected by the detector 243 and the disposition under the standard sound emission condition (there is misalignment), the control unit 21 adjusts the sound pressure of sound emission in the sound emission device 3 in accordance with the difference. For example, when the position of the sound emission device 3 under the device sound emission conditions is closer to a localization set for any sound image than the position of the sound emission device 3 under the standard sound emission conditions, the control unit 21 increases the sound pressure of the sound emission device 3. On the contrary, when the position is apart, the control unit 21 decreases the sound pressure of the sound emission device 3. Accordingly, deviation in sound image localization due to misalignment is suppressed.

(14) Although in the foregoing embodiment, the identification unit 210 which is the function to be realized by the control unit 21 of the audio processor references the correction content table 221 of the storage unit 22, and identifies the correction contents of processed sound data such that the second sound emitted by the sound emission device 3 under the acquired device sound emission conditions is close to the first sound determined on the video game machine 1 side, the correction contents may be identified so as to make the second sound close to the third sound determined on the audio processor 2 side. Similarly to the first sound, the term "third sound" means sound designated about how the user listens to original sound indicated by original sound data, and has a clear difference from the first sound. Information which designates the third sound may be determined by user operation on the operation unit 23 of the audio processor 2 or may be stored in the storage unit 22 in advance. That is, in the foregoing embodiment, as an example of the third sound, the first sound determined on the video game machine 1 side is set (that is, there is no difference from the first sound).

Processed sound data acquired through the acquisition unit 25 is processed by the video game machine 1 such that the first sound is emitted under the standard sound emission conditions, and the audio processor 2 acquires the processed control signal or the control signal, thereby identifying the content of processing in the video game machine 1. Accordingly, the identification unit 210 can use the difference between the third sound determined on the audio processor 2 side and the first sound determined on the video game machine 1 side. That is, the identification unit 210 can identify the correction contents to correct the processed sound data directly close to the third sound based on the difference between the device sound emission conditions and the standard sound emission conditions, the processed control signal (or the control signal), and processed sound data acquired in association with the sound emission device 3.

Reference Signs List

1: video game machine, 1a: reproducer, 11: control unit, 110: video game progression unit, 111: original sound data generation unit, 112: control signal generation unit, 12: storage unit, 121: video game program, 13: operation unit, 131: operator, 14: display unit, 15: output unit, 151: packet processing unit, 152: processing unit, 1520: interpretation unit, 1521: synchronization unit, 1523: sound effect application unit, 1524: localization processing unit, 2, 2a: audio processor, 21: control unit, 210: identification unit, 211: synchronization unit, 212: sound quality correction unit, 213: sound effect correction unit, 22: storage unit, 221: correction content table, 23: operation unit, 231: operator, 24: connection unit, 241: D/A converter, 242: amplifier, 243: detector, 25: acquisition unit, 251: packet processing unit, 3, 3C, 3L, 3R, 3SL, 3SR, 3SW: sound emission device, 4: network, 5: server device, 9, 9a: audio processing system

The invention claimed is:

1. An audio processor connectable to a sound emission device that emits a sound according to supplied data, the audio processor comprising:
   an acquisition unit having an interface configured to acquire:
      processed sound data, which is original sound data having been processed according to a content of processing defined so that determined first sound is emitted under a standard sound emission condition, wherein the processed sound data is acquired in association with the sound emission device; and
      a control signal including at least one of a parameter indicating the content of processing on the original sound data or information indicating a configuration of the processed sound data corresponding to the original sound data processed using the parameter;

a connection unit having a detector configured to detect a device sound emission condition of the sound emission device connected to the audio processor; and a control unit connected to a memory and configured to execute:
  a sound emission condition acquiring task that acquires, from the connection unit, the device sound emission condition based on the detected device sound emission condition from the detector;
  a processed sound data acquiring task that acquires the processed sound data from the acquisition unit;
  a control signal acquiring task that acquires the control signal from the acquisition unit;
  an identifying task that identifies a correction content of the processed sound data based on (i) a difference between the acquired device sound emission condition and the standard sound emission condition, (ii) the control signal acquired by the control signal acquiring task, and (iii) the processed sound data acquired in association with the sound emission device by the processed sound data acquiring task to generate a second sound, which is to be emitted by the sound emission device under the acquired device sound emission condition, close to the determined first sound or a third sound defined to be different from the determined first sound;
  a correction task that corrects the processed sound data according to the correction content identified by the identifying task; and
  a supplying task that supplies the processed sound data corrected by the correcting task to the sound emission device via the connection unit.

2. The audio processor according to claim 1, wherein the acquisition unit is further configured to:
  acquire identification information of the original sound data; and
  transmit the acquired identification information of the original sound data to an external device, and acquire the control signal including at least one of the parameter of the original sound data indicated by the identification information or information indicating a configuration of the processed sound data corresponding to the original sound data processed by the external device using the parameter.

3. The audio processor according to claim 1, wherein:
the acquisition unit is further configured to transmit a signal indicating the acquired device sound emission condition to an information processor that provides the processed sound data to acquire the processed sound data,
the supplying task supplies uncorrected processed sound data to the sound emission device without correcting the processed sound data by the correction task when the processed sound data acquired by the acquisition unit is processed sound data corresponding to the original sound data processed by the information processor according to the content of processing defined so that the determined first sound is emitted based on the transmitted signal indicating the acquired device sound emission condition transmitted by the acquisition unit.

4. An audio processing system comprising:
a sound emission device that emits a sound according to supplied data;
an information processor; and
an audio processor connectable to the sound emission device, and includes:
  an acquisition unit having an interface and configured to acquire:
    processed sound data, which is original sound data having been processed according to a content of processing defined so that determined first sound is emitted under a standard sound emission condition, wherein the processed sound data is acquired in association with the sound emission device; and
    a control signal including at least one of a parameter indicating the content of processing on the original sound data or information indicating a configuration of the processed sound data corresponding to the original sound data processed using the parameter;
  a connection unit having a detector configured to detect a device sound emission condition of the sound emission device connected to the audio processor; and
  a first control unit connected to a first memory and configured to execute:
    a sound emission condition acquiring task that acquires, from the connection unit, the device sound emission condition based on the detected device sound emission condition from the detector;
    a processed sound data acquiring task that acquires the processed sound data from the acquisition unit;
    a control signal acquiring task that acquires the control signal from the acquiring unit;
    an identifying task that identifies a correction content of the processed sound data based on (i) a difference between the acquired device sound emission condition and the standard sound emission condition,(ii) the control signal acquired by the control signal acquiring task, and (iii) the processed sound data acquired in association with the sound emission device by the processed sound data acquiring task to generate a second sound, which is to be emitted by the sound emission device under the acquired device sound emission condition, close to the determined first sound or a third sound defined to be different from the determined first sound;
    a correction task that corrects the processed sound data according to the correction content identified by the identifying task;
    a supplying task that supplies the processed sound data corrected by the correcting task to the sound emission device via the connection unit,
  wherein the information processor includes:
    a second control unit having a second memory and configured to generate original sound data indicating original sound and a parameter indicating a content of processing on the original sound data in accordance with user operation;
    an output unit having an interface configured to communicate data to an external apparatus, and configured to:
      process the original sound data generated by the control unit according to the content of processing indicated by the parameter to generate processed sound data;
      output the processed sound data to the external device; and
      outputs the control signal including at least one of the parameter indicating the content of processing on the original sound data or information indicating a configuration of the processed sound data to the external device.

5. A non-transitory computer-readable storage medium storing a program executable by an audio processor connectable to a sound emission device that emits a sound according to supplied data and having an acquisition unit having an interface configured to acquire processed sound data, a connection unit having a detector configured to detect a device sound emission condition of the sound emission device connected to the audio processor, and a control unit connected to a memory, the program being executable by the control unit to execute a method comprising:

a sound emission condition acquiring step of acquiring, from the connection unit, the device sound emission condition based on the detected device sound emission condition from the detector;

a processed sound data acquiring step of acquiring, from the acquiring unit, the processed sound data, which is original sound data having been processed according to a content of processing defined so that determined first sound is emitted under a standard sound emission condition, wherein the processed sound data is acquired in association with the sound emission device;

a control signal acquiring step of acquiring, from the acquiring unit, a control signal including at least one of a parameter indicating the content of processing on the original sound data or information indicating a configuration of the processed sound data corresponding to the original sound data processed using the parameter;

an identifying step of identifying a correction content of the processed sound data based On (i) a difference between the acquired device sound emission condition and the standard sound emission condition, (ii) the control signal acquired in the control signal acquiring step, and (iii) the processed sound data acquired in association with the sound emission device in the processed sound data acquiring step to generate a second sound, which is to be emitted by the sound emission device under the acquired device sound emission condition, close to the determined first sound or a third sound defined to be different from the determined first sound;

a correction step of correcting the processed sound data according to the correction content identified in the identifying step; and a supplying step of supplying the processed sound data corrected by the correcting step to the sound emission device via the connection unit.

* * * * *